United States Patent [19]
Busch et al.

[11] 3,937,003
[45] Feb. 10, 1976

[54] ELECTRIC CLOCK

[75] Inventors: Dieter Busch, Wollstadt; Roland Sudler, Frankfurt, both of Germany

[73] Assignee: VDO Adolf Schindling AG, Frankfurt am Main, Germany

[22] Filed: Nov. 18, 1974

[21] Appl. No.: 524,878

[30] Foreign Application Priority Data

Nov. 28, 1973 Germany .............................. 2359142

[52] U.S. Cl. .................................. 58/23 D; 318/138
[51] Int. Cl.[2] ...................... H02K 59/02; G04C 3/00
[58] Field of Search ........... 58/23 R, 23 D; 318/138, 318/213, 254, 217

[56] References Cited

UNITED STATES PATENTS

| | | | |
|---|---|---|---|
| 3,597,915 | 8/1971 | Aizawa | 58/23 D |
| 3,744,327 | 7/1973 | Hetzel | 58/23 D X |
| 3,810,355 | 5/1974 | Ito | 58/23 A |
| 3,860,844 | 1/1975 | Hetzel | 58/23 D |

*Primary Examiner*—Edith Simmons Jackmon
*Attorney, Agent, or Firm*—Otto John Munz

[57] ABSTRACT

The invention relates to an electric clock with an oscillator, especially a quartz oscillator, a frequency divider connected thereto, and a control stage connected to the output of the frequency divider either directly or via a pulse shaper stage. Through the control stage, a stepper motor, preferably a single-phase stepper motor, connected to the hand mechanism is acted upon by square-wave pulses of identical or alternating polarity.

8 Claims, 4 Drawing Figures

ELECTRIC CLOCK

BACKGROUND OF THE INVENTION

1. Field of the Invention

The invention relates to an electric clock of the type which uses a frequency divider to step down oscillations from an electric oscillator.

2. Description of the Prior Art

Quartz clocks are already known which use a vibrating quartz crystal operating in the megahertz range and whose output frequency is reduced, by means of a frequency divider, to a value ranging in the Hertz range. When a stepper motor is employed for driving a hand mechanism, the output frequency of the oscillator is reduced to 0.5 to 1 Hertz, or, when a synchronous motor is used, to 50 or 60 Hertz. For reasons of economy, however, a stepper motor is usually provided as the drive means for the hand mechanism. The low-frequency signal supplied by the frequency divider is fed, in one known device, to a pulse shaper stage, wherein the duration of the individual pulses of the low-frequency signal is reduced. The pulse shaper stage is constructed as a logic circuit which is triggered by various higher frequency output signals from the frequency divider and operates in the manner of a mixer. The pulse train transmitted by the pulse shaper stage is fed to a control stage which connects the stepper motor to the operating voltage source. The stepper motor is connected to the hand mechanism for the duration of one pulse prevailing at the control stage input. The stepper motor is consequently acted upon by square wave pulses of identical or alternating polarity, depending on the structure of the control stage.

Quartz clocks are generally operated independently of an a.c. power network, and are operated by means of a battery as voltage source. Thus, the power consumption of quartz clocks must be as small as possible. This requirement could be met by feeding short duration square-wave pulses to the stepper motor. This is possible per se within certain limits, but, when the pulse duration is shortened, an increase in the natural vibrations of the motor armature occurs. This causes a quivering movement of the second hand and, even more serious, it causes relatively loud noises to be produced.

To eliminate these shortcomings, attempts have been made to dampen the natural vibrations of the motor armature mechanically. In one known device, an inertia mass, such as a ring, a sleeve, or a disc, is loosely mounted on the armature shaft. In another known device, a portion of the armature shaft extends into or through a dampening chamber filled with silicon oil. However, this and other known devices using a mechanical dampening can only incompletely suppress the natural vibrations of the motor armature. Moreover, even if a rather acceptable noise dampening and dampening of the second hand movement could be achieved, the dampening agents eventually wear out and must therefore be replaced. Finally, a determination of the optimal possible dampening in the individual embodiments is difficult and time-consuming since it is necessary to proceed empirically.

SUMMARY OF THE INVENTION

These difficulties and disadvantages are overcome by the invention. The invention is directed to measures by which the natural vibrations of the motor armature can be permanently eliminated. The measures to be taken are simple and are capable of being carried out with the minimum expense and time. The invention provides electric or electronic means for extending the decay time of the trailing edge of each pulse fed to the stepper motor.

Thus, at the beginning of each step of the motor armature, a sufficiently high starting torque is produced by the pulse component with an amplitude which is constant or nearly constant in time. At the end of a step of the motor armature, a brake or stopping torque is exerted by the pulse component upon the motor armature, thereby largely preventing an overshooting oscillation of the motor armature and thus preventing an oscillation of entry of the motor armature into its new position. Thus the second hand moves stepwise without quivering and the noises which are relatively loud in known clocks can be reduced to a non-disturbing minimum. A special advantage of a device according to the invention is that the duration of the pulse component with an amplitude which is constant or nearly constant in time can be substantially shortened in comparison to known clocks. Thus, taking into account the pulse component with an amplitude depending on time, the stepper motor can be supplied with pulses of a smaller current-time or voltage-time integral, and thus there is a smaller power consumption than in known clocks. Moreover, the electric or electronic means required for suppressing the natural vibrations of the motor armature are not subject to any noteworthy wear, and therefore maintenance of the clock is reduced.

In a preferred embodiment, an increase in the decay period of the trailing edge of each pulse is brought about by at least one current or voltage divider whose individual stages can be successively switched between operative and inoperative conditions. The pulse fed to the stepper motor therefore have in each case a stair-like decaying trailing edge. The required increase in the trailing edge decay period could also be achieved by a capacitive load of the stepper motor, but such a solution has, in comparison with the preceeding one, the disadvantage that not only the decay time of the trailing edge but also the ascending time of the front edge of each pulse is affected, which would have an unfavorable effect upon the power consumption. To these disadvantages must be added the considerably greater need for space of such a capacitive embodiment, since, in contrast to the preferred embodiment, the capacitive embodiment requires discrete structural elements and cannot be integrated in integrated circuits. In the preferred embodiment, the frequency divider, the control stage and possibly the pulse shaper stage can be combined in an integrated circuit. The required lengthening of the trailing edge decay time could be accomplished by a corresponding shaping and actuating of the pulse shaper stage by the frequency divider. However, difficulties in transmission of such a pulse to the control stage might arise.

For actuating each current and voltage divider, it is suitable to provide a logic circuit which is triggered, indirectly or directly, by the frequency divider. In comparison with timing circuits which are likewise possible, with timing circuits, this circuit has the advantage of having a simpler structure and of being capable of being constructed in a completely integrated structure. Consequently, it is also cheaper and its structural volume may be very small.

The controllable current or voltage divider or dividers may be inserted between the frequency divider and the pulse shaper stage, or may be inserted in the pulse shaper stage, or may be connected to the outputs of the pulse shaper stage. Provision of at least one current divider in the output of the control stage has proved particularly suitable. This arrangement has the advantage, in comparison with the other mentioned possibilities, that in the pulse shaper stage as well as in the control stage, no measures need be taken that render the existing circuit more expensive to accomplish a fully satisfactory transmission of the pulse presenting a stair-shaped trailing edge.

In an advantageous embodiment, each current divider is composed of at least two transistors whose through-passages are connected in parallel. With respect to the number of transistors to be chosen, three to four transistors are generally sufficient. A number larger than this acts favorably on the operation of the stepper motor, because, with a larger number of transistors, the stairlike curve of the trailing edge of each pulse is transformed into a steady or nearly steady curve, but the expense grows with the number of transistors, and with a greater number of transistors, there is not sufficient improvement in the stepper motor operation to justify the added expense. The amplitude curve of the trailing edge of each pulse as a function of time can be adapted within wide limits to requirements in a simple manner by switching on corresponding resistors in the individual through-passages of the transistors, or by the use of transistors with transmitting resistance of different magnitudes. Such adaptation is particularly possible when field-effect transistors are employed.

When a stepper motor actuated by current pulses of alternating polarity is used, a particularly advantageous result is obtained when a bridge-like switch consisting of four transistors is provided in the control stage. This switch allows the stepper motor to be connected, with its poles reversible, to the operating voltage. Furthermore, at least two additional transistors are provided in each of the two alternatingly operative current paths, the passage paths of these transistors being parallel to those of the transistors assigned to the switch. The additional use of the switch transistors as part of the current conductor allows a particularly consumption-saving, compact structure.

Especially in the case of integrated structure of the individual stages of the clock in bipolar technique, it is advisable to construct each current divider of at least two constant current sources which can be individually switched to operative and inoperative conditions. By this device a smaller power consumption is achieved in a clock constructed in bipolar technique, in comparison with the previously described embodiments, which are especially suitable for an integrated structure in MOS (metal-oxide semi-conductor) technique or techniques based thereon. With a stepper motor actuated by current pulses of alternating polarity, it is particularly advantageous to provide a switch in the control stage constructed in the form of a four-transistor bridge, in one diagonal of which the stepper motor is mounted, and in the bridge feeding diagonal of which are mounted three constant current sources, which can be individually switched to operative and inoperative positions.

BRIEF DESCRIPTION OF THE DRAWINGS

The invention will be explained in greater detail with the aid of a diagrammatical representation of one embodiment.

DESCRIPTION OF THE PREFERRED EMBODIMENT

Figure 1:
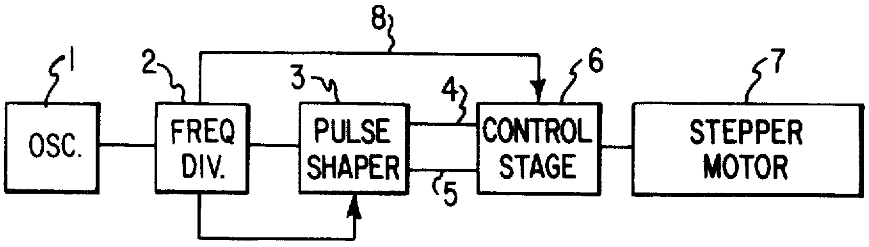
FIG. 1 is a block diagram of the electric portion of a clock according to the invention.

The electric clock contains, as shown in FIG. 1, a quartz oscillator 1, whose oscillator crystal is operated at a frequency of 4,194,304 Hz. A frequency divider 2, connected to the output of the oscillator, consists of 23 stages with a total frequency division ratio of 1 to $2^{23}$. Consequently, a signal with a frequency of 0.5 Hz appears at the output of frequency divider 2. This low-frequency signal, which consists of a sequence of pulses of alternating polarity, is fed to a pulse shaper stage 3 which is actuated by various stages of frequency divider 2. Besides a reduction of the scanning ratio of the pulse sequence without change of the frequency, pulse shaper 3 may carry out further shaping of the individual pulses, so that a square wave pulse sequence is available in the output circuit of pulse shaper stage 3. Pulse shaper stage 3 is constructed as a logic circuit and operates in the manner of a mixer. Pulse shaper stage 3 is provided with two outputs, one of which supplies pulses of positive polarity, and the other supplies the pulses of negative polarity in the pulse sequence. One of the outputs is connected via a line 4, and the other via a line 5, to the two inputs of a control stage 6. A single-phase stepper motor 7 can be actuated by the control stage by pulses of alternating polarity. Control stage 6 is actuated by several stages of frequency divider 1 via lines 8.

Figure 2:
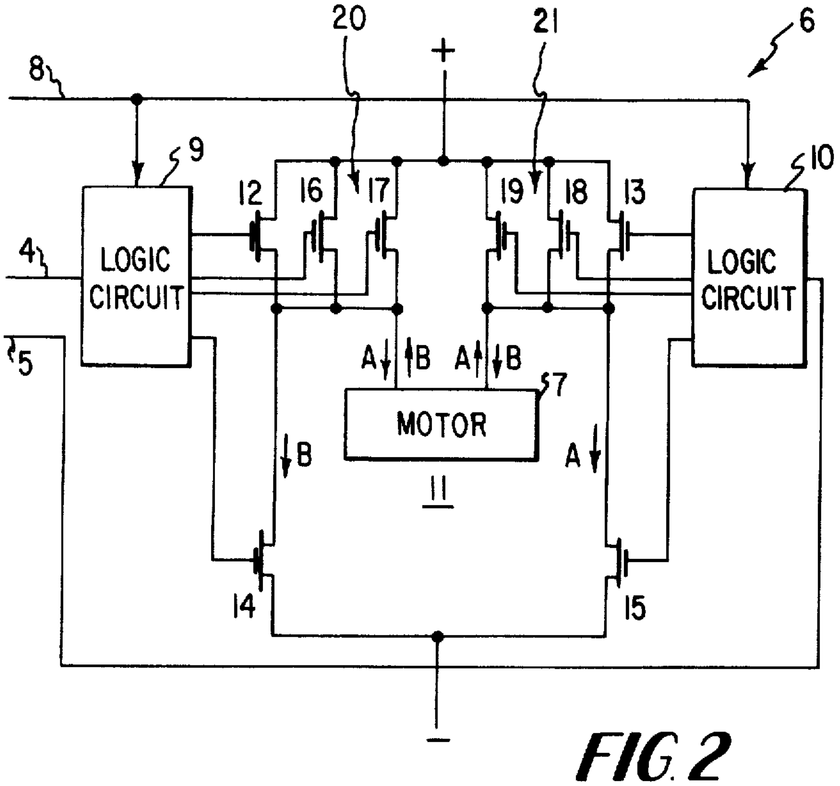
FIG. 2 is a simplified block diagram of the control stage of the clock according to FIG. 1, constructed in MOS technique.

As shown in FIG. 2, control stage 6 comprises two logic circuits 9 and 10, one of which is connected, via a line 4, and the other via a line 5, to pulse shaper stage 3. Other inputs of the two logic circuits 9 and 10 are connected to lines 8. Control stage 6 also contains a switch 11, consisting of four field-effect transistors 12, 13, 14, and 15, which are connected in the form of a bridge. In one bridge diagonal the single-phase stepper motor 7 is connected, and in the other bridge diagonal is connected the operating voltage source which is indicated by the + and − signs.

In the state of rest, the field-effect transistors 12 and 13 block the current, while the field-effect transistors 14 and 15 are conductive. At the arrival of a positive pulse through line 4, field-effect transistor 12 is brought to its conductive state, by way of logic circuit 9, and field-effect transistor 14 is brought to its blocking state, so that a current can flow in the direction of the arrow A through the motor coil. A corresponding process takes place when logic circuit 10 is actuated by a negative pulse via line 5. Then a current flows in the direction of the arrow B through the motor coil. Consequently stepper motor 7 is actuated by pulses of alternating polarity.

In each of the two alternatingly operative current paths, two additional field-effect transistors 16 and 17 or, respectively, 18 and 19 are provided, whose source-drain paths are connected in parallel with those of the field-effect transistors 12 and 13, and which form therewith in each case a current divider 20 or 21, respectively. Resistors may be provided for setting the required current divider ratios in the individual branches.

Figure 4:
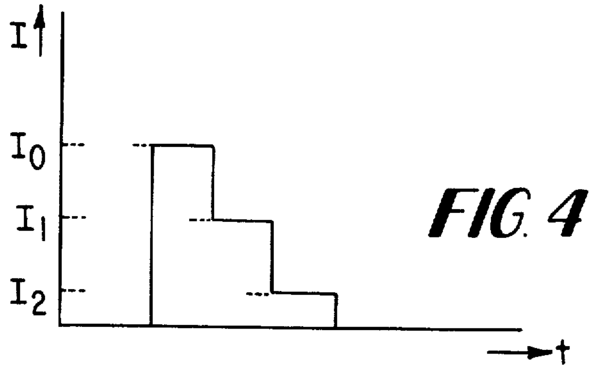
FIG. 4 is a curve of the current-time function of a pulse fed to the stepper motor.

Field-effect transistors 16 to 19 are likewise actuated by way of logic circuits 9 and 10, and this is carried out in such a way that they become effective simultaneously with field-effect transistors 12 and 13 and that they are switched to the inoperative position at different times, either before or after field-effect transistors 12 and 13. When therefore, for example, the logic circuit 9 is actuated via line 4 by a pulse, field-effect transistors 12, 16, and 17 are connected into passage direction, and field-effect transistor 14 is connected into its blocking phase, so that a relatively high current $I_0$ flows through the motor coil. After a prespecified period of time, field-effect transistor 17 is brought into its blocking phase, whereby the effective transmitting resistance in this branch increases and a diminished current $I_1$ flows. After a further prespecified period of time, field-effect transistor 16 is brought into its blocking phase, and the current diminishes further to a value $I_2$. Finally, field-effect transistor 12 is brought into its blocking state, and field-effect transistor 14 into its conductive state again, so that the initial state is reached again. The current which flows through the motor coil during the entire time consequently presents a time curve as shown in FIG. 4. The decay time of the trailing edge of each pulse fed to stepper motor 7 is therefore increased by the current dividers 20 and 21 which are actuated after a delay.

Instead of individual field-effect transistors, field-effect transistors consisting of two or more parts may also be provided. Thus, for example, individual field-effect transistors 12, 16, and 17 can be replaced by a single field-effect transistor. The same applies to field-effect transistors 13, 18, and 19. Likewise it is possible to replace, for example, the two field-effect transistors 12 and 14, and the two field-effect transistors 16 and 17 in each case by a bipartite field-effect transistor. This applies to field-effect transistors 13 and 15, as well as 18 and 19.

Figure 3:
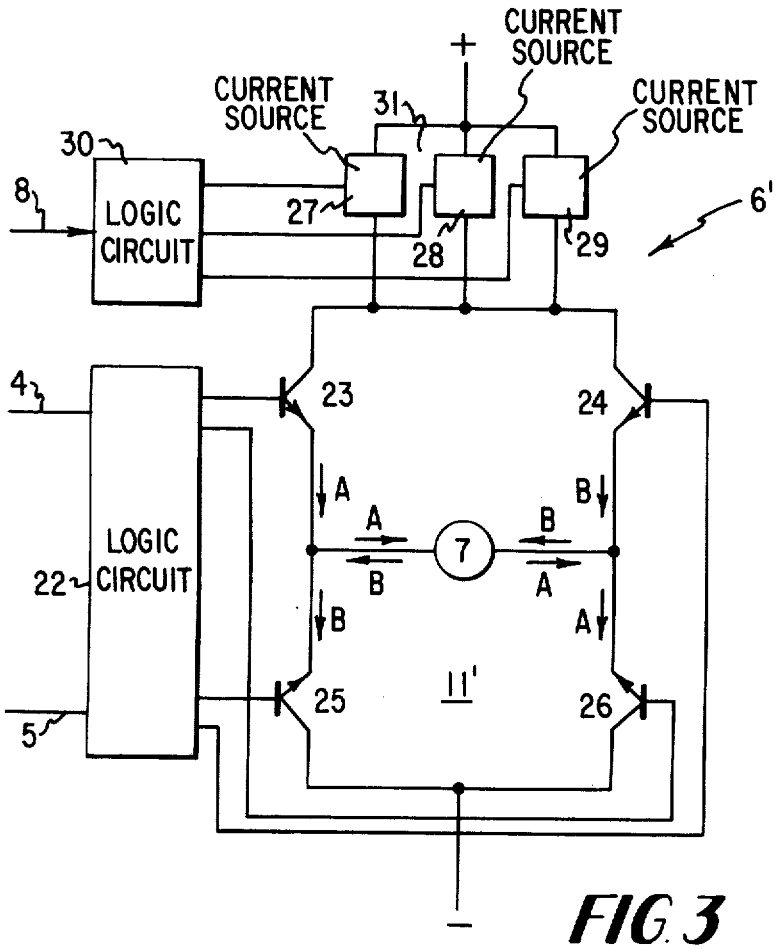
FIG. 3 is a simplified block diagram of a control stage of the clock, constructed in bipolar technique.

The control stage shown in FIG. 2 is particularly suitable for employment in an MOS technique. A control stage especially constructed to be employed in bipolar technique is shown in FIG. 3.

An alternate embodiment of control stage 6 (FIG. 3) contains a logic circuit 22 whose inputs are connected to lines 4 and 5, and whose outputs are connected to four bipolar transistors 23, 24, 25, and 26 which form a switch 11'. The four bipolar transistors 23, 24, 25, and 26 are connected in the form of a bridge, in one diagonal of which the single-phase stepper motor 7 is positioned and whose other diagonal is connected to the operating voltage by way of three controllable constant current sources 27, 28, and 29. Constant current sources 27, 28 and 29 are actuated by way of a logic circuit 30 which is connected, via lines 8, to frequency divider 2.

At the arrival of a positive pulse via line 4, bipolar transistors 23 and 26 are switched by way of logic circuit 22, into passage condition, and bipolar transistors 24 and 25 are switched into blocking condition. At the same time, the three current sources 27, 28, and 29 which constitute the current divider 31 of control stage 6, are switched to the operative position by way of logic circuit 30. Consequently, a high current $I_0$ now flows in the direction A through the motor coil. After a prespecified time period, current source 29 is switched off and the current that flows through the motor coil diminishes to the value $I_1$. After a further prespecified time period, current source 28 is switched off, whereby the current diminishes to the value $I_2$. After the passage of a prespecified time period the bipolar transistors 23 and 26 are brought back into their blocking condition, so that the current that flows through the motor coil is reduced to zero. The analogous result applies when a negative pulse arrives at the input of logic circuit 22, which is connected to line 5.

What is claimed is:

1. In an electric clock comprising:

A. oscillator means (1) for providing a substantially fixed frequency oscillating electrical signal, B. frequency-divider means (2) responsive to the fixed frequency oscillating electrical signal for providing a reduced frequency oscillating electrical signal, C. a stepper motor (7) for driving hands of the clock, and D. control means responsive to the reduced frequency oscillating electrical signal for driving the stepper motor, the improvement wherein the control means comprises:

E. pulse generating means responsive to the reduced frequency signal for generating a train of pulses at said reduced frequency, and F. decay-time means (20, 21, 31) for lengthening the decay-time of the trailing edge of each pulse in said train of pulses.

2. A clock according to claim 1 wherein the decay-time means comprises:

A. at least one divider element (20, 21, 31)

B. means for switching the individual stages of (12, 16, 17; 13, 18, 19; 27, 28, 29) of said at least one divider element to be successively operative and inoperative.

3. A clock according to claim 2 further comprising a logic circuit (9, 10, 30) actuated in response to the frequency-divider means (2) for actuating each divider element.

4. A clock according to claim 3, wherein the at least one divider element comprises at least one current divider (20, 21, 31) in the output of the control means.

5. A clock according to claim 4 wherein each current divider (20, 21) contains at least two transistors (16, 17, 18, 19) having their passage paths connected in parallel.

6. A clock according to claim 5, further comprising:

A. a four-transistor bridge switch (12, 13, 14, 15) means for connecting the stepper motor (7) to an operating voltage, the switch operating selectively to reverse the polarity of the operating voltages as applied to the stepper motor, and B. said current divider providing two alternately effective current paths comprising said at least two transistors (16, 17, 18, 19) with their passage paths connected in parallel to those of two (12, 13) of the four transistors in said bridge switch.

7. A clock according to claim 4 wherein the current divider (31) comprises;

A. at least two constant current sources (27, 28, 29), and

B. means controlled by the logic circuit (30) for individually and selectively switching the current sources between operative and inoperative conditions.

8. A clock according to claim 7 further comprising:

A. a four-transistor bridge switch (23, 24, 25, 26) having two diagonals,

B. means for connecting the stepper motor in one of said diagonals, and

C. means for connecting the constant current sources to feed current in the other diagonal.

* * * * *